United States Patent [19]

Deschamps et al.

[11] 4,174,383
[45] Nov. 13, 1979

[54] PROCESS FOR PURIFYING A SULFUR DIOXIDE CONTAINING GAS WITH PRODUCTION OF ELEMENTAL SULFUR

[75] Inventors: André Deschamps, Chatou; Claude Dezael, Maisons Laffitte; Henri Gruhier, Chatillon sous Bagneux; Philippe Renault, Noisy le Roi, all of France

[73] Assignee: Institut Francais du Petrole, Rueil-Malmaison, France

[21] Appl. No.: 717,943

[22] Filed: Aug. 26, 1976

Related U.S. Application Data

[63] Continuation of Ser. No. 532,606, Dec. 13, 1974, abandoned.

[30] Foreign Application Priority Data

Dec. 17, 1973 [FR] France ................ 73 45151

[51] Int. Cl.$^2$ .................. C01B 17/00; C01B 1702
[52] U.S. Cl. ................... 423/573 R; 423/242
[58] Field of Search ........... 423/242, 541 A, 547, 423/573 R, 573 L, 574 C, 567, 578

[56] References Cited

U.S. PATENT DOCUMENTS

| | | | |
|---|---|---|---|
| 1,992,572 | 2/1935 | Harnest | 423/547 |
| 2,152,454 | 3/1939 | Baehr | 423/541 A |
| 3,321,275 | 5/1967 | Furkert et al. | 423/541 A |
| 3,503,185 | 3/1970 | Delzenne et al. | 423/242 |
| 3,535,083 | 10/1970 | Smith | 423/242 |
| 3,561,925 | 2/1971 | Deschamps et al. | 423/573 |
| 3,645,671 | 2/1972 | Griffin et al. | 423/541 A |
| 3,773,900 | 3/1973 | Roberts et al. | 423/567 A |
| 3,833,710 | 9/1974 | Deschamps et al. | 423/573 |
| 3,880,983 | 4/1975 | Weltz et al. | 423/242 |
| 3,883,638 | 5/1975 | Renault et al. | 423/242 |
| 3,883,643 | 5/1975 | Renault et al. | 423/574 L |
| 3,983,225 | 9/1976 | Van Brocklin | 423/574 L |

FOREIGN PATENT DOCUMENTS

| | | | |
|---|---|---|---|
| 599073 | 3/1948 | United Kingdom | 423/574 L |
| 947640 | 3/1961 | United Kingdom | 423/573 L |
| 952502 | 3/1964 | United Kingdom | 423/478 |

*Primary Examiner*—O. R. Vertiz
*Assistant Examiner*—Gary P. Straub
*Attorney, Agent, or Firm*—Millen & White

[57] ABSTRACT

Process for purifying SO$_2$-containing gas comprising a first step of contacting said gas with an aqueous solution of an ammonium sulfite or an ammonium thiosulfate also containing ammonium sulfate, a second step of contacting the resulting solution with a H$_2$S-containing gas at 20°–90° C. to produce sulfur which is separated from the remaining solution, a third step of recyling 90 to 99.99% by volume of said remaining solution to the first step, and a fourth step of introducing 0.01 to 10% by volume of said remaining solution into a molten salt formed of ammonium sulfate and/or bisulfate so as to produce a gas containing SO$_2$, ammonia, sulfur and steam, which is recycled to the first step.

12 Claims, 1 Drawing Figure

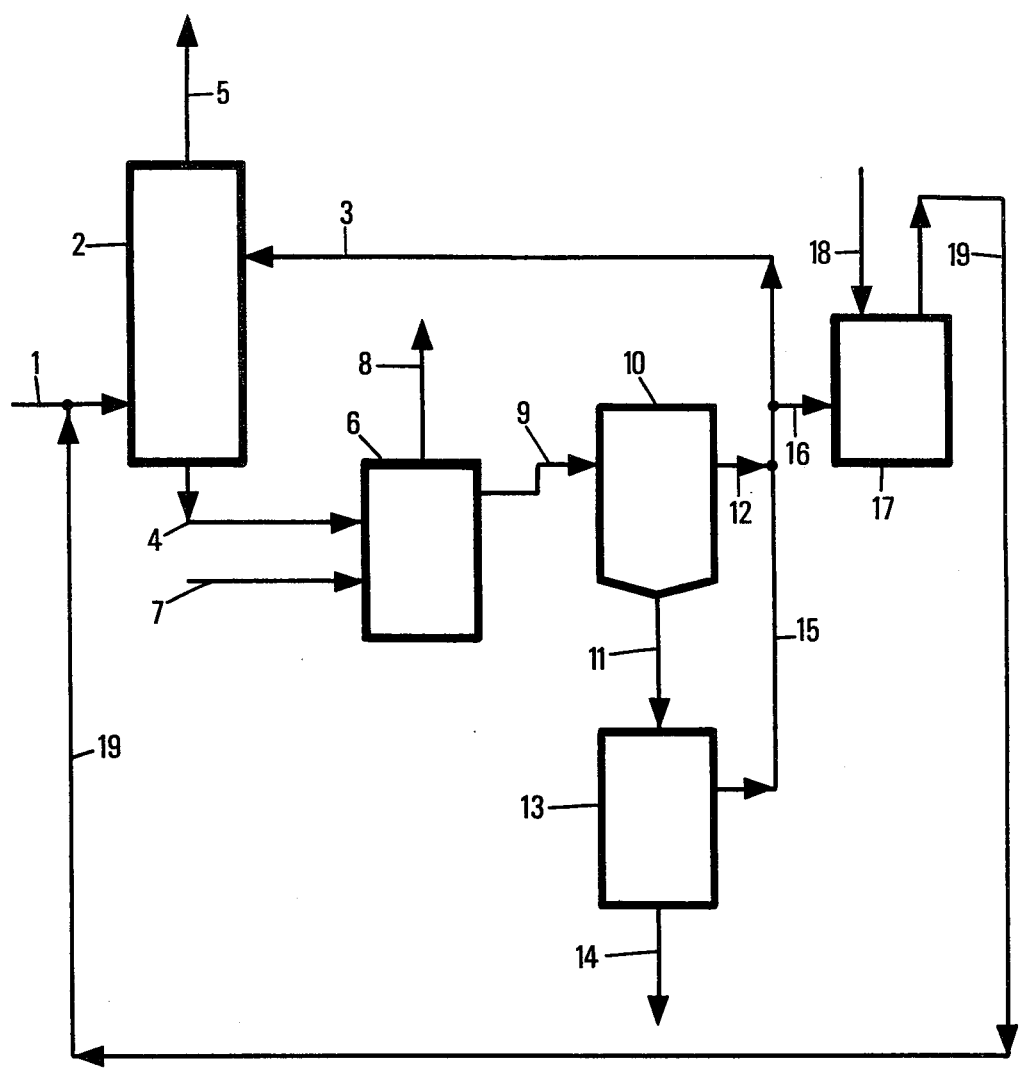

PROCESS FOR PURIFYING A SULFUR DIOXIDE CONTAINING GAS WITH PRODUCTION OF ELEMENTAL SULFUR

This is a continuation of application Ser. No. 532,606, filed Dec. 13, 1974, now abandoned.

Many industrial gaseous effluents contain sulfur dioxide, a major atmospheric pollutant. By way of example, these are the flue gases emanating from fossil full power plants, sulfuric acid plants, sulfur incinerating plants, and ore roasting plants. Although numerous processes have been proposed to reduce the sulfur dioxide content of these effluents, the performance of these processes is, very often impeded by the fact that they result in a high consumption of chemical products or in the production of useless by-products, the discharge of which results in further pollution.

The process of the present invention makes it possible to remove sulfur dioxide from a gaseous stream containing the same and to convert it to sulfur without suffering from the above-mentioned disadvantages.

The process of the invention comprises the following steps of:

(a) contacting the impure gas with an aqueous solution of at least one salt selected from the group consisting of ammonium sulfites and ammonium thiosulfate, said solution also containing an ammonium sulfate and having a pH of 3 to 5.5 at the beginning of said contacting step and a pH of 2.5 to 5 at the end of said contacting step, so as to absorb the sulfur dioxide, then separating the gas from the solution and, (b) contacting the solution produced in (a), whose pH is from 2.5 to 5, with a hydrogen sulfide containing gas so as to produce sulfur, separating the sulfur from the solution and fractionating the latter in two portions, (c) feeding back one portion to stage (a) and, (d) introducing the other portion into a molten salt consisting of ammonium sulfate and/or bisulfate in order to produce a gas containing sulfur dioxide, ammonia, sulfur and steam, which is recycled to (a).

This process differs from the process already described in French Pat. No. 2 146 598, in that we obtain sulfur directly by reaction between the solution and H₂S, and not ammonium thiosulfate whose latter conversion to sulfur requires the use of high temperatures. This is due to the fact that, according to the prior patent, the molar ratio of $NH_4HSO_3$ to $(NH_4)_2SO_3$ was from 0.5 to 1.5, thereby corresponding to a molar ratio of $NH_3$ to $SO_2$ from 1.4 to 1.66 and, consequently, to pH values higher than 5.5.

The pH values from 2.5 to 5, used according to the invention in the reaction between H₂S and the SO₂ containing solution, correspond to molar ratios of $NH_3$ to $SO_2$ lower than about 1.4 and accordingly, to the use of ammonium sulfite in the form of a mixture of the neutral sulfite with the bisulfite, in which the ratio of ammonium bisulfite to ammonium neutral sulfite is relatively high.

The pH of the absorbing solution is from 3 to 5.5 at the inlet of the absorber and from 2.5 to 5 at the outlet of the absorber. Under these conditions, sulfur dioxide reacts with the absorbing solution to form different sulfur containing species such as ammonium bisulfite, thiosulfate or polythionates.

The ammonium sulfite and/or thiosulfate concentration of the aqueous solution in the first stage is preferably at least 0.1 mole/liter, for example from 0.1 to 5 moles/liter. The solution may also contain an ammonium polythionate.

Said solution may further contain ammonium sulfate and/or bisulfate.

The total concentration of ammonium ions of the absorbing solution may vary over a wide range, for example from 0.1 to 10 g.ions/liter. Too low a concentration will result in a low absorption capacity of the solution and requires a high flow rate of the solution. Too high a concentration would create crystallization problems in the absorber.

Generally, we make use of an ammonium concentration from 1 to 6 g.ions/liter.

The temperature, during the absorption step is maintained in the range from 20° to 90° C. The absorption is more efficient at lower temperatures.

At higher temperatures, the flow rate of the aqueous solution must be increased in order to ensure satisfactory purification of the exhaust gas. Generally, for economic reasons, we proceed near the dew point of the fume. Under these conditions, the sulfur dioxide content of the exhaust gas may be lowered to less than 50 ppm by volume.

The gases subjected to the treatment of the invention contain, for example, from 0.02 to 10% by volume of sulfur dioxide.

The contact of hydrogen sulfide with the solution containing sulfur dioxide, is carried out at temperatures which may vary from 20° to 90° C. Preferably, in order to avoid costly heat exchangers, it is advisable to proceed at a temperature close to that of absorption. The reactions which produce sulfur and regenerate the solution require an appreciable contact time of the latter in the reactor. The contact time depends on various parameters such as temperature, hydrogen sulfide feeding rate, efficiency of the gas liquid contact and so on. It may be reduced by making use of cascade reactors. Generally, a residence time of from 1 to 30 minutes is sufficient.

The proportion of hydrogen sulfide, by moles, is at least 2 times the amount of absorbed sulfur dioxide. We prefer to make use of hydrogen sulfide in excess with respect to the stoichiometry; the excess of hydrogen sulfide is either recycled by means of a compressor or sent to a unit for sulfur conversion, such as a Claus unit, for example.

The liquid effluent from the reactor contains suspended sulfur. The latter is removed by filtration, decantation, centrifugation or by melting under pressure. A preferred method consists of performing a decantation in an apparatus of the hydrocyclone type. The sulfur slurry recovered from the bottom of this apparatus is conveyed to an autoclave where it is heated under pressure to a temperature of about 120° to 130° C. We thus obtain sharply separated liquid sulfur and an aqueous phase which is recycled to the absorption stage.

The action of hydrogen sulfide on the absorbing solution of high sulfur dioxide content provides essentially sulfur by means of complex reactions in which participate sulfite, thiosulfate or polythionate ions. These reactions also permit the recovery of the initial pH of the absorbing solution and, consequently, the regeneration of its sulfur dioxide absorbing power. However, after a certain number of cycles, we observe a substantial decrease of the pH. This is due to side reactions which complex ammonium ions in an irreversible manner, essentially in the form of ammonium sulfate. Ammonia can be added to compensate for this loss and maintain the pH at a convenient value. Simultaneously, we observe an enrichment of the solution in sulfate ions which, after a long period, leads to problems of crystallization in the circuits. In order to avoid these difficulties, it is necessary to introduce a costly step of sulfate crystallization to maintain the salt content of the solution at a stationary value. This embodiment has the disadvantages of consuming ammonia and producing a by-product, ammonium sulfate, while requiring a high investment cost.

By the process of the invention, we obviate these disadvantages by sending a portion of the solution obtained at the outlet of the sulfur producing reactor, into a reactor containing ammonium hydrogen sulfate and/or neutral sulfate in a molten state or, preferably, a mixture of both salts, maintained at a temperature from 250° to 400° C. Under these conditions, the solution is vaporized and the salts contained therein are decomposed with the formation of a gas stream containing sulfur dioxide, ammonia, water and sulfur vapor. This stream is sent to the step of sulfur dioxide absorption, either in a gaseous state or, after total or partial condensation. This reactor is heated by any convenient means, for example by means of a hot gas.

The operation of this loop for the treatment of a portion of the absorbing solution, provides simultaneously for the maintenance of the pH value and the ammonium sulfate content of the absorbing solution in the desired zones without addition of fresh ammonia or elimination of by-products.

An increase in the feed rate of the solution supplied to the reactor containing molten ammonium sulfate results in a decrease of the sulfate content of the absorbing solution circulating through the main circuit and in an increase of the pH. For economic considerations, it is not advantageous to increase this feed rate excessively. Generally, the flow rate of the derived stream is from 0.01% to 10% of the flow rate of absorbing solution in the main circuit.

The advantages of this process will be made clearly apparent from the following non-limitative examples of the invention.

EXAMPLE 1

The process according to the invention is performed in an apparatus as shown in FIG. 1 and under the following conditions:

A gas produced by incineration of an exhaust gas from a Claus unit and having the following composition by volume:

| $SO_2$ | $H_2O$ | $O_2$ | $CO_2$ | $N_2$ |
|---|---|---|---|---|
| 1% | 30% | 2% | 5% | 62% | is introduced at a rate of 10 $Nm^3/h$ (i.e. measured under normal conditions of temperature and pressure) through duct 1, into the lower portion of a packing column 2. At the top of said column, we introduce, through line 3, 100 liters/hour of an aqueous solution which trickles on the packing and absorbs sulfur dioxide before being withdrawn from the bottom through line 4, substantially at the same rate. The temperature of the column is about 72° to 75° C.

The gas which evolves from the stack 5 only contains 40 ppm by volume of sulfur dioxide.

The solution containing sulfur dioxide, having a pH of about 3.5, is introduced into the reactor 6 containing 20 liters of the circulating solution and of suspended sulfur, at a temperature from 70° to 75° C.

At the bottom of said reactor, we introduce, through line 7, 250 Nl/h of pure $H_2S$ through a diffuser. $H_2S$ in excess (about 50 l/h) is withdrawn through line 8 with steam; however it may optionally be recycled to the reactor by means of a compressor. Through line 9, we discharge the regenerated absorbing solution containing suspended sulfur; it is sent to a hydrocyclone 10 from which we separate a sulfur slurry through line 11 and a solution substantially free of sulfur through line 12. The slurry, containing about 15 to 20% by weight of sulfur, is sent to an autoclave 13, in which the temperature is maintained at 120° to 130° C. Sulfur separates in the form of a liquid phase, withdrawn through line 14. Above the liquid sulfur is an aqueous phase which is withdrawn through line 15 and recycled simultaneously with that issued from line 12, towards the absorption column 2, through line 3.

A small fraction of this solution, about 0.5 liter/hour, is sent, as a continuous stream, through line 16, to the reactor 17 containing about 0.5 liter of a molten salt consisting of a mixture of ammonium hydrogen sulfate and ammonium neutral sulfate, maintained at 350° C. by injection of hot gases through line 18.

These gases and the decomposition products ($SO_2$, $NH_3$, $H_2O$ and S) of the aqueous solution feed, return through line 19 to the absorption column 2.

In operation, the unit produces, as an average, 428 g of sulfur per hour. The absorbing solution, circulating through line 3, contains about 1 mole/liter of ammonium sulfate, 0.8 mole/liter of ammonium thiosulfate and 0.1 mole/liter of ammonium neutral sulfite. Its pH is about 4.2, and does not vary with time although no fresh ammonia is added.

EXAMPLE 2

In a second experiment, the absorbing solution in line 3 contained:

1 mole/liter of $(NH_4)_2SO_4$, 0.785 mole/liter of $(NH_4)_2O_3$, 0.085 mole/liter of ammonium sulfites and 0.03 mole/liter of $(NH_4)_2S_3O_6$. Its pH was 4.1.

The same results as in the preceding example have been obtained.

We claim:

1. A process for purifying a sulfur dioxide-containing gas, comprising the steps of:
   (a) contacting the impure gas with an aqueous solution containing at least ammonium sulfite, ammonium thiosulfate, and ammonium sulfate and to form a solution having at the end of said contact step a pH from 3.5 to 5, in order to absorb sulfur dioxide, then separating the gas from the solution,
   (b) reacting resultant $SO_2$-containing aqueous solution from step (a) whose pH is from 3.5 to 5 with a hydrogen sulfide containing gas at 20°–90° C., to produce an aqueous phase containing dispersed solid sulfur and dissolved ammonium sulfate and ammonium thiosulfate,
   (c) separating resultant aqueous phase containing sulfur into (1) a concentrated dispersion of said sulfur in a fraction of said aqueous phase and (2) a substantially sulfur-free fraction of said aqueous phase,
   (d) heating the concentrated dispersion of step (c) to melt sulfur contained therein and separating said molten sulfur therefrom to form a substantially sulfur-free aqueous phase, (e) recycling to step (a) a portion of said substantially sulfur-free aqueous phases obtained in steps (c) and (d), the total amount of dissolved ammonium sulfate and the total amount of dissolved ammonium thiosulfate in said aqueous phases emanating from steps (c) and (d) being greater with respect to the amounts of ammonium sulfate and ammonium thiosulfate, respectively, in the aqueous absorbing solution of step (a), (f) introducing residual portion of said substantially sulfur-free aqueous phases into a molten salt formed of ammonium sulfate and/or bisulfate at 250°–400° C. and decomposing ammonium sulfate and ammonium thiosulfate in said residual portion in order to produce a decomposition gas containing sulfur dioxide, ammonia and steam so as to retard a buildup with respect to time of ammonium sulfate and ammonium thiosulfate in the process, and (g) recycling said decomposition gas to step (a).

2. A process according to claim 1, in which the aqueous solution in step (a) contains at least 0.1 mole/liter of a salt selected from ammonium sulfites and ammonium thiosulfate.

3. A process according to claim 1, in which step (a) is conducted at 20°–90° C.

4. A process according to claim 1, in which the residual portion of the solution treated in step (f) amounts to 0.01 to 10% by volume of the recycled aqueous phases of step (e).

5. A process according to claim 1 in which the treated gas contains 0.02 to 10% by volume of sulfur dioxide.

6. A process according to claim 1, in which the total ammonium ion concentration of the aqueous solution used in step (a) is from 1 to 6 gram-ions per liter.

7. A process according to claim 1, in which the aqueous solution used in step (a) also contains an ammonium polythionate.

8. A process according to claim 1, wherein said separating in step (c) is conducted by hydrocycloning said resultant aqueous phase containing sulfur.

9. A process according to claim 1, wherein said concentrated dispersion of said sulfur in a fraction of said aqueous phase comprises about 15–20% by weight of sulfur.

10. A process according to claim 1, wherein step (d) is conducted under sufficient pressure to maintain the aqueous component of the concentrated dispersion in the liquid phase during the heating thereof.

11. A process according to claim 10, wherein said heating in step (d) is conducted at about 120°–130° C.

12. A process according to claim 11, wherein said separating in step (c) is conducted by hydrocycloning and the resultant concentrated dispersion of said sulfur in a fraction of said aqueous phase comprises about 15–20% by weight sulfur.

* * * * *